L. J. TETLOW.
LUBRICATING WHEEL.
APPLICATION FILED AUG. 16, 1911.

1,043,741.

Patented Nov. 5, 1912.

WITNESSES:
H. L. Sprague
R. H. Mowry

INVENTOR,
Lewis J. Tetlow,
BY
ATTORNEY.

UNITED STATES PATENT OFFICE.

LEWIS J. TETLOW, OF WEST SPRINGFIELD, MASSACHUSETTS.

LUBRICATING-WHEEL.

1,043,741. Specification of Letters Patent. Patented Nov. 5, 1912.

Application filed August 16, 1911. Serial No. 644,375.

*To all whom it may concern:*

Be it known that I, LEWIS J. TETLOW, a citizen of the United States of America, and resident of West Springfield, in the county of Hampden and State of Massachusetts, have invented certain new and useful Improvements in Lubricating-Wheels, of which the following is a full, clear, and exact description.

This invention relates to improvements in wheel and shaft bearings and is particularly applicable in relation to trolley wheels running on a fixed axle or any wheel revoluble about a fixed shaft, in which wheel is a lubricant chamber inwardly opening to the bore thereof so that grease or other lubricant may pass from such chamber for lubrication between the journal bearing portion of the wheel and the axle.

Practice and tests have disclosed that in the running action of a revoluble wheel having a lubricant chamber therein feeding grease or oil to the axle, a vacuum is created in the very slight annular space between the hub of the wheel and the axle which is effective for the suction or drawing of the lubricant from the grease chamber onto the axle, which lubricant is worked toward the ends of the hub and out from between the bearing parts, conducing to waste and an early exhaustion of all of the lubricant which may have been provided in the chamber therefor in the wheel.

The object of this invention is to insure that the axle bearing of the trolley wheel shall be effectually lubricated by grease or other lubricant carried within the wheel for a very long time without such lubricant becoming excessively wasted under the rotary action of the bearing parts relatively to the fixed axle.

The invention is described in conjunction with the accompanying drawings and is set forth in the claims.

Figure 1:
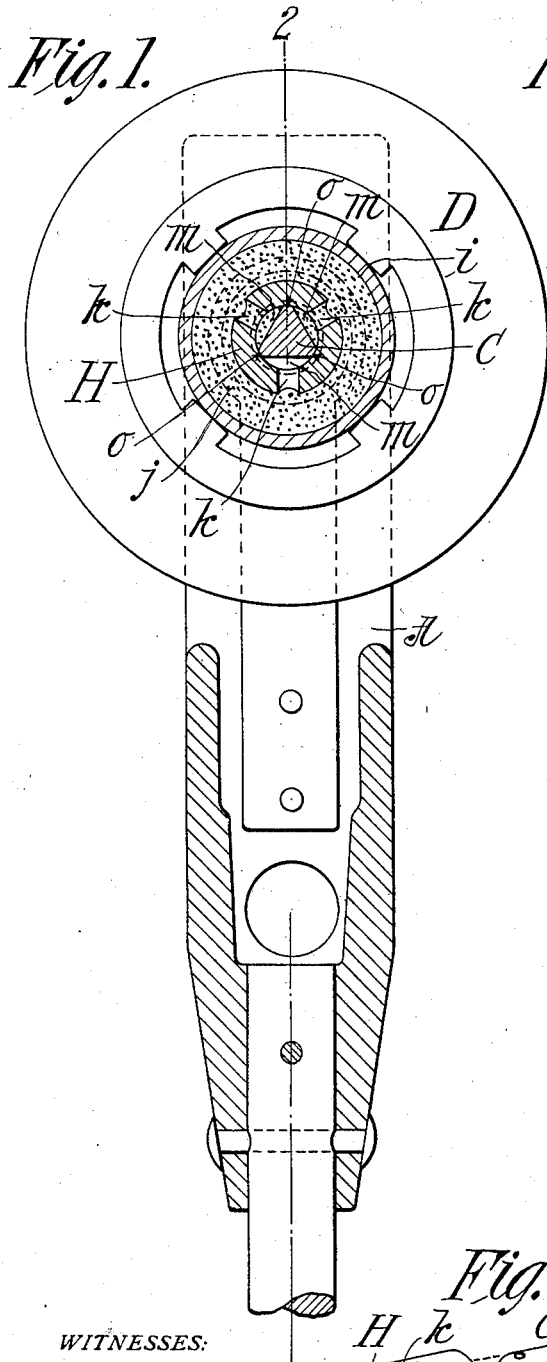
Figure 2:
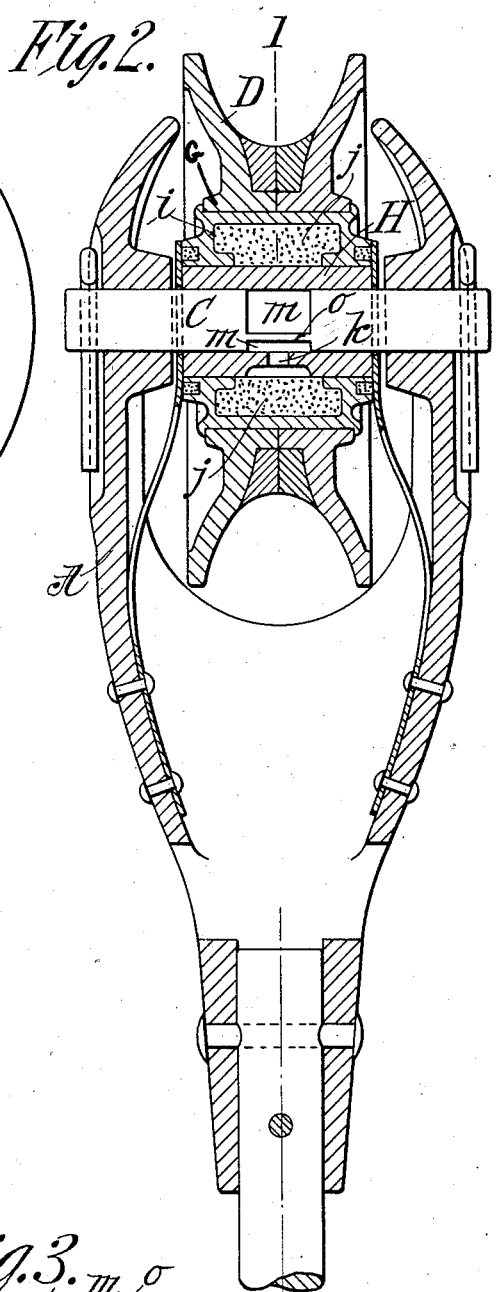
Figure 3:
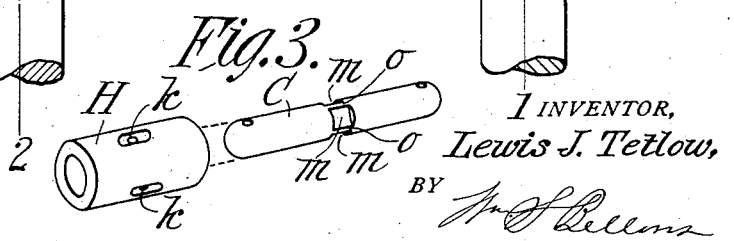

In the drawings:—Figure 1 is a representation in sectional view taken on line 1—1, Fig. 2, of a trolley wheel mounted in a harp on a fixed supporting axle therefor. Fig. 2 is a sectional view of the same, taken on line 2—2, Fig. 1. Fig. 3 is a perspective view of the novel pocket provided axle and the bushing provided with radial ducts prominently constituting the subject matter of this invention.

In the drawings, A represents a trolley harp and C represents the axle supported between the opposite cheeks of the harp on which the trolley wheel D is rotatably mounted.

The hub portion G of the wheel body is made with an annular lubricant chamber $i$,—$j$ representing heavy grease or other lubricant therein, said chamber opening inwardly to the central opening or bore through the hub in and through which a metallic bushing H of sleeve form is inserted with a driving fit so as to operate as a fixed part of the wheel. The bushing has radial openings $k$ through its middle portion, and the axle C is made with a plurality of pockets or recesses $m$ $m$ within its periphery with which the said radial openings $k$ in the bushing communicate.

As shown, these pockets or recesses $m$ are produced by transversely cutting away the central portion of the periphery of the axle at three different points leaving but narrow peripheral and longitudinally extending portions $o$ of the axle to form the partitions or dividing walls between one and another of the pockets $m$. The said recesses or pockets $m$ are preferably made with walls which are perpendicular or at a great angle to the length of such pockets whereby abrupt end walls or shoulders are formed.

The grease oozing or flowing from the annular chamber in the body of the wheel through the radial openings in the bushing to the axle will for the greater portion thereof enter the pockets $m$ in the axle to be intercepted or trapped therein, and to be far less subject to any effect or tendency of the lubricant to work outward along the length of the axle in an excessive degree for a speedy exhaustion of the lubricant from within the annular chamber in the wheel.

The wheel rapidly rotating on the axle has the action or effect of causing the lubricant to pass to and out from the opposite end openings of the hub portion of the wheel; and this effect is counteracted by the provision of the pockets to such a degree that the quantity of the lubricant with which the wheel is internally provided will last many times longer than would be the case were the axle of plain and peripherally continuous character.

The feed of the lubricant from the pocket-provided middle portion of the axle toward the ends of such axle and of the hub surrounding it may be in large measure determined by the width of the continuous peripheral portions o of the axle between the pockets; that is, if the pockets are separated by only very slight width of peripherally continuous portions o of the axle, the lubricant feed will be the more conserved, while if the pocket-dividing peripheral portions o are comparatively wide, correspondingly will be increased the tendency of the lubricant to work freely endwise of the axle and a more copious feed and quicker exhaustion will result. Therefore, in practice, especially in trolley wheels it is desirable to have the pocket-separating peripheral portions o of the axle very narrow, as sufficient lubrication between the bushing of the wheel and the axle will be acquired under such conditions,—the aim being to get continuously and for a long time but a very small quantity of lubricant throughout the entire length of the bearing parts rather than to get a profuse lubrication for only a comparatively short time.

Preparatory to the assemblage of the parts the chamber in the body of the wheel is filled with grease or heavy lubricant and the pockets in the axle are also filled with such lubricant, as may also be the radial holes in the bushing so that the said parts assembled and put into use are fully charged with the lubricating material and may be used for a protracted period, in fact until the bearings are completely worn out, without the necessity of replenishment of the grease.

Demonstration of this invention made by subjecting a trolley wheel having the radially drilled bushing and mounted on an axle having the pockets as described to many days of use alongside of and in comparison with a trolley wheel mounted on a simple axle which is plain and smooth throughout its entire length, has shown my trolley wheel capable of withstanding wear many times the number of days a wheel mounted on the plain axle was capable of running, without becoming burned and worn out.

I claim:—

1. In combination, a wheel having its hub formed with an axle bore therethrough and with an annular lubricant chamber opening inwardly into said bore; an annular bushing tightly secured in said bore and having a plurality of centrally-located, radial openings communicating with said chamber; and an axle on which the bushing provided wheel is rotatably mounted having its periphery formed with a plurality of spaced centrally-located pockets with which said openings also communicate, the portions of said periphery between adjacent pockets separating the same from each other and acting as conductors which convey the lubricant to the bushing, the width of said conductors governing the quantity of lubricant fed to the bushing.

2. In combination, a trolley wheel having its hub formed with an axial bore and with an annular lubricant chamber opening inwardly into said bore; an annular bushing tightly secured in said bore and having a plurality of centrally-located, radial openings communicating with said chamber; and an axle on which the bushing-provided wheel is rotatably mounted having the central portion of its periphery cut away transversely at different points, to produce a series of spaced pockets with which said openings also communicate, and continuous longitudinal portions separating said pockets from each other, said longitudinal portions acting as conductors which convey the lubricant to the bushing, the width of said conductors governing the quantity of lubricant fed to the bushing.

Signed by me at Springfield, Mass., in presence of two subscribing witnesses.

LEWIS J. TETLOW.

Witnesses:
FRANK D. ORTON, Jr.,
G. R. DRISCOLL.

---

Copies of this patent may be obtained for five cents each, by addressing the "Commissioner of Patents, Washington, D. C."